(12) United States Patent
Lee et al.

(10) Patent No.: US 7,242,429 B1
(45) Date of Patent: Jul. 10, 2007

(54) METHOD FOR CANCELLATION OF THE EFFECT OF CHARGE FEEDTHROUGH ON CMOS PIXEL OUTPUT

(75) Inventors: Hae-Seung Lee, Bedford, MA (US); Keith Glen Fife, Stanford, CA (US)

(73) Assignee: SMAL Camera Technologies, Cambridge, MA (US)

( * ) Notice: Subject to any disclaimer, the term of this patent is extended or adjusted under 35 U.S.C. 154(b) by 719 days.

(21) Appl. No.: 10/335,677

(22) Filed: Jan. 2, 2003

Related U.S. Application Data (60) Provisional application No. 60/345,780, filed on Jan. 3, 2002.

(51) Int. Cl.
*H04N 3/14* (2006.01)
*H04N 5/335* (2006.01)

(52) U.S. Cl. ...................... 348/308; 348/296
(58) Field of Classification Search ........... 348/308, 348/296, 297
See application file for complete search history.

(56) References Cited

U.S. PATENT DOCUMENTS

| | | | |
|---|---|---|---|
| 6,947,087 B2 * | 9/2005 | Egawa et al. ............... | 348/304 |
| 6,952,226 B2 * | 10/2005 | Zhang et al. ............... | 348/294 |
| 7,015,964 B1 * | 3/2006 | Koizumi et al. ............ | 348/301 |
| 2002/0105581 A1 * | 8/2002 | Masaki et al. ........... | 348/229.1 |

OTHER PUBLICATIONS

"A 256×256 CMOS Imaging Array with Wide Dynamic Range Pixels and Column-Parallel Digital Output" Decker et al. *IEEE Journal of Solid-State* Circuits. Dec. 1988. vol. 33, No. 12.

* cited by examiner

*Primary Examiner*—Ngoc-Yen Vu
*Assistant Examiner*—Adam L. Henderson
(74) *Attorney, Agent, or Firm*—Gauthier & Connors LLP (57) ABSTRACT

A method for determining a pixel output value of an imager; the imager having a plurality of pixels, a reset switch associated with each pixel and a select switch associated with each pixel; due to incident illumination upon a pixel of the imager after a reset period. The method captures a first pixel output value when the reset switch is OFF during a reset period and the select switch is ON during a reset period and captures a second pixel output value when the select switch is ON near an end of an integration period. If the second pixel output value is captured when the select switch is ON near an end of a first integration period, the first pixel output value may be captured when the reset switch is OFF during a reset period preceding the first integration period and the select switch is ON during a reset period preceding the first integration period. Moreover, if the second pixel output value is captured when the select switch is ON near an end of a first integration period, the first pixel output value may be captured when the reset switch is OFF during a reset period immediately following the first integration period and the select switch is ON during a reset period immediately following the first integration period.

23 Claims, 4 Drawing Sheets

METHOD FOR CANCELLATION OF THE EFFECT OF CHARGE FEEDTHROUGH ON CMOS PIXEL OUTPUT

PRIORITY INFORMATION

This application claims priority, under 35 U.S.C. § 119, from U.S. Provisional Patent Application Ser. No. 60/345,780, filed on Jan. 3, 2002; the entire contents of which are hereby incorporated by reference.

FIELD OF THE PRESENT INVENTION

The present invention relates to the determination of a pixel output voltage due to incident illumination upon a pixel of a CMOS digital imager during an integration period. More specifically, the present invention relates to the determination of a pixel output voltage due to incident illumination upon a pixel of a CMOS digital imager during an integration period which corrects for voltage feedthrough caused by a reset switch and/or select switch.

BACKGROUND OF THE PRESENT INVENTION

CMOS image sensors are attractive for use in a wide range of applications, such as still photography and video imaging products, due to their compatibility with VLSI circuit design and fabrication processing. Since low-cost, large-scale CMOS design and fabrication technologies that have been developed for large-volume VLSI circuits can be directly employed in the production of CMOS imagers, CMOS imagers are, in general, much more cost effective than imagers produced based on CCD technologies. As a result, for many applications, and particularly for consumer products, a CMOS imager is preferred over a corresponding CCD imager.

In comparing the performance of CMOS and CCD imagers, it is found that CMOS imagers are typically characterized as introducing into an imaged scene a level of fixed-pattern noise that is higher than that introduced by CCD imagers. Fixed-pattern noise in an image is here meant to refer to image noise that is substantially constant over time; i.e., fixed pattern noise does not substantially vary from frame to frame in a sequence of images, and any variation of the noise over time due to, e.g., temperature and aging effects, is so slow as to be undetectable in a sequence of image frames.

CMOS fixed-pattern noise is generally due to mismatches in the threshold voltages of the MOS transistors of a CMOS pixel, as well as being due to feedthrough of electronic charge, associated with the MOS pixel transistors, to the output of a pixel. Such threshold voltage mismatch and charge feedthrough effects can vary from pixel to pixel in a CMOS imager array. As a result, a pattern of noise is produced across an image, corresponding to the spatial variation of noise levels from pixel to pixel across the pixel array. A grainy image is the typical manifestation of the noise.

Beyond fixed pattern noise, charge feedthrough across CMOS pixel transistors is also found to produce a fixed offset in the lowest intensity limits of a CMOS imager. This fixed offset, also known as a dark offset, is generally constant across a CMOS pixel array. The dark offset reduces the available voltage swing of pixels, thereby limiting the dynamic range of the imager. Double-sampling of a CMOS pixel output, i.e., sampling of the pixel output at different times, e.g., during a pixel reset period and then again during an integration period, is a well-known technique often employed for correcting for the fixed pattern noise caused by MOS transistor threshold voltage mismatch. This technique enables a determination of the extent of a pixel output that is due to fixed pattern noise, in the manner described below. This double-sampling technique suffers, however, in that it does not enable the determination and/or correction of feedthrough of electronic charge across the pixel MOS transistors to the pixel output.

One method known for partial compensation of the impact of charge feedthrough is a calibration technique in which the dark offset and fixed pattern noise of an imager are determined under dark conditions, at a selected temperature, with a corresponding compensation factor then being applied to images once they have been collected. Although this technique does enable some amount of correction of the dark offset and fixed pattern noise caused by charge feedthrough, it requires the application of a calibration factor to the post-processing of images, typically by the end user of the imager.

Moreover, due to the calibration factor application's complexity, the calibration factor application is typically enabled only in very high-end imager designs and is not practical for general commercial imagers. But even when a calibration factor is employed, the calibration factor is determined only at one selected operating temperature at a single point in time; and therefore, the calibration factor does not account for temperature-dependent changes in dark offset and/or fixed pattern noise and further does not account for aging effects on the imager.

In summary, the double-sampling and dark offset compensation techniques conventionally employed in CMOS image processing are not fully effective and not optimally efficient in eliminating the effect of charge feedthrough on pixel output measurements.

Therefore, it is desirable to provide a non-complex process for compensating for both CMOS fixed pattern noise and electronic charge feedthrough across CMOS pixel transistors. Furthermore, it is desirable to provide a non-complex compensation process that accounts for temperature-dependent changes in dark offset and/or fixed pattern noise and further accounts for aging effects on the imager.

SUMMARY OF THE PRESENT INVENTION

A first aspect of the present invention is a method for determining a pixel output value of an imager; the imager having a plurality of pixels and a reset switch associated with each pixel; due to incident illumination upon a pixel of the imager after a reset period. The method captures a first pixel output value when the reset switch is OFF; captures a second pixel output value when the reset switch is OFF; and determines a difference between the first and second pixel output values, the difference being the pixel output value due to incident illumination upon the pixel of the imager after the reset period.

A second aspect of the present invention is a method for determining a pixel output value of an imager; the imager having a plurality of pixels, a reset switch associated with each pixel, and a select switch associated with each pixel; due to incident illumination upon a pixel of the imager after a reset period. The method captures a first pixel output value when the reset switch is OFF and the select switch is ON at the beginning of an integration period; captures a second pixel output value when the reset switch is OFF and when the select switch is ON at an end of an integration period;

and determines a difference between the first and second pixel output values, the difference being the pixel output value due to incident illumination upon the pixel of the imager after the reset period.

A third aspect of the present invention is a method for determining a pixel output value of an imager; the imager having a plurality of pixels, a reset switch associated with each pixel, and a select switch associated with each pixel; due to incident illumination upon a pixel of the imager after a reset period. The method turns the select switch ON during a reset period; turns the reset switch ON after turning the select switch ON; turns the select switch OFF after turning the reset switch ON; turns the reset switch OFF after turning the select switch OFF; turns the select switch ON after turning the reset switch OFF; captures a first pixel output value after turning the select switch ON with the reset switch being OFF; turns the select switch OFF after capturing the first pixel output value; turns the select switch ON near an end of an integration period; captures a second pixel output value after turning the select switch ON near an end of an integration period with the reset switch being OFF; and determines a difference between the first and second pixel output values, the difference being the pixel output value due to incident illumination upon the pixel of the imager after the reset period.

A fourth aspect of the present invention is a method for determining a pixel output value of an imager; the imager having a plurality of pixels, a reset switch associated with each pixel, and a select switch associated with each pixel; due to incident illumination upon a pixel of the imager after a reset period. The method turns the select switch ON near a beginning of an integration period; turns the reset switch ON after turning the select switch ON; turns the select switch OFF after turning the reset switch ON; turns the reset switch OFF after turning the select switch OFF; turns the select switch ON after turning the reset switch OFF; captures a first pixel output value after turning the select switch ON with the reset switch being OFF; turns the select switch OFF after capturing the first pixel output value; turns the select switch ON near an end of the integration period; captures a second pixel output value after turning the select switch ON near the end of the integration period with the reset switch being OFF; and determines a difference between the first and second pixel output values, the difference being the pixel output value due to incident illumination upon the pixel of the imager after the reset period.

A fifth aspect of the present invention is a method for determining a pixel output value of an imager; the imager having a plurality of pixels, a reset switch associated with each pixel, and a select switch associated with each pixel; due to incident illumination upon a pixel of the imager after a reset period. The method turns the select switch ON near an end of an integration period; captures a first pixel output value after turning the select switch ON near the end of the integration period with the reset switch being OFF; turns the reset switch ON after capturing the first pixel output value; turns the select switch OFF after turning the reset switch ON; turns the reset switch OFF after turning the select switch OFF; turns the select switch ON after turning the reset switch OFF; captures a second pixel output value after turning the select switch ON with the reset switch being OFF near a beginning of an integration period immediately following the integration period; and determines a difference between the first and second pixel output values, the difference being the pixel output value due to incident illumination upon the pixel of the imager after the reset period.

A sixth aspect of the present invention is a method for determining a pixel output value of an imager; the imager having a plurality of pixels, a reset switch associated with each pixel, and a select switch associated with each pixel; due to incident illumination upon a pixel of the imager after a reset period. The method turns the select switch ON near an end of an integration period; captures a first pixel output value after turning the select switch ON near the end of the integration period with the reset switch being OFF; turns the reset switch ON after capturing the first pixel output value; turns the select switch OFF after turning the reset switch ON; turns the reset switch OFF during a reset period corresponding to an integration period immediately following the integration period; turns the select switch ON after turning the reset switch OFF during the reset period corresponding to an integration period immediately following the integration period; captures a second pixel output value after turning the select switch ON with the reset switch being OFF during the reset period corresponding to an integration period immediately following the integration period; and determines a difference between the first and second pixel output values, the difference being the pixel output value due to incident illumination upon the pixel of the imager after the reset period.

A seventh aspect of the present invention is a method for canceling select switch feedthrough associated with an imager; the imager having a plurality of pixels, a reset switch associated with each pixel, and a select switch associated with each pixel, whenever the reset switch is activated during a reset period. The method turns the select switch ON during a reset period; turns the reset switch ON after turning the select switch ON; turns the select switch OFF after turning the reset switch ON; and turns the reset switch OFF after turning the select switch OFF.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

It is noted that in the descriptions below the references to a row select switch are not limited to a row select switch, but the concepts of the present invention may also be utilized in connection with a column select switch, a hybrid of row and column select switches, or any switch used to select a pixel from which the output value is being captured.

Figure 1:
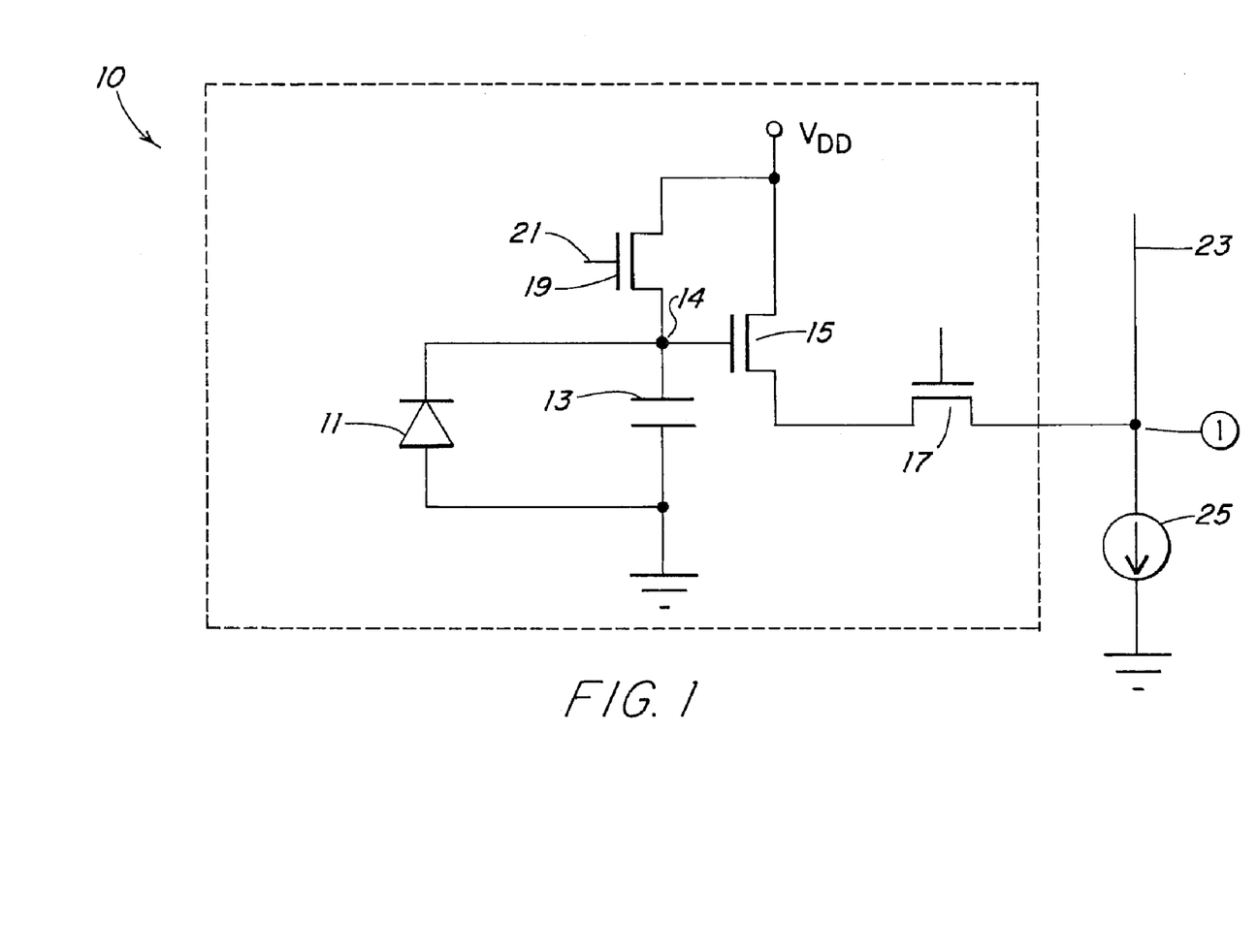
FIG. 1 illustrates a schematic diagram of a pixel.

Referring to FIG. 1, the operation of a CMOS active pixel 10 will be described. The example pixel configuration, as illustrated in FIG. 1, employs a photodiode 11, but it is to be recognized that in general, the pixel can include other light collecting configurations, embodied as, e.g., a phototransistor, a photogate, or other selected configuration. In the current example, a photodiode 11 of the pixel 10 produces a current of photogenerated electrical charge in response to illumination intensity incident on the photodiode. The resulting photocurrent causes charge associated with a capacitor 13 of the photodiode 11 to dissipate in proportion to the incident illumination intensity. As an electrical element, the photodiode capacitor 13 physically is provided as the parasitic reverse-biased P-N junction capacitance associated with the photodiode itself.

A MOS transistor 15 operates as a source follower that buffers the voltage of the photodiode capacitor 13, at a sense node 14 of the capacitor, nondestructively to a column line 23 for read out of the pixel voltage. A row select MOS switch 17 activates the source follower transistor 15 when the particular row of an imager in which the pixel resides is selected to thereby enable the photodiode capacitance voltage measurement. When the row select MOS switch 17 of the row is turned ON, and a current source 25 is connected to the source of the MOS transistor 15, the MOS transistor 15 and the current source 25 operate as a source-follower configuration to buffer the voltage of the photodiode capacitor sense node 14 to the column line 23 for determining the capacitor voltage at the end of an exposure period, thereby to measure the electronic charge held by the pixel.

Prior to an integration period over which the pixel is controlled to respond to incident illumination, the pixel photodiode is first 'reset' with a reset voltage that places an electronic charge on the photodiode capacitor 13. It is the charge corresponding to this reset voltage that is dissipated from the photodiode capacitance as the photodiode produces charge in response to scene illumination. When the pixel is reset, the gate of the pixel reset transistor 19 is brought up to a MOS 'high' value that is typically $V_{DD}$, to turn ON the reset transistor and bias the sense node 14. The waveform of a voltage reset signal, $V_{RESET}$, applied at the gate of the pixel's reset transistor 19 is shown by the voltage timing diagram 2A of FIG. 2, and the resulting output voltage waveform, $V_O$, of the pixel is shown by the voltage timing diagram 2B of FIG. 2. By application of the reset voltage to the reset transistor 19, the photodiode capacitor 13 is reset to a voltage at the sense node 14 that is given approximately as $(V_{DD}-V_{TH19})$, where $V_{TH19}$ is the threshold voltage of the reset transistor 19.

Figure 2A:
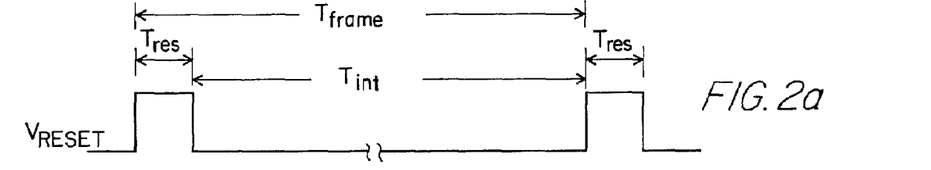
FIG. 2 is a set of timing diagrams showing exemplary voltage waveforms of a voltage reset for a pixel and a voltage output of the pixel according to the concepts of the present invention.
Figure 2B:
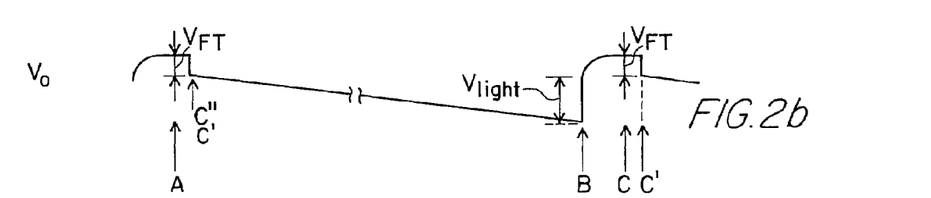

The output of the pixel $V_O(A)$, measured at the sense node 14 at time A, defined to be a point in time at which the reset signal, $V_{RESET}$, is high, as shown in the voltage timing diagram 2A of FIG. 2, and after the pixel output has substantially reached steady state, as shown at time A in the voltage timing diagram 2B of FIG. 2, is given by:

$$V_O(A)=V_{DD}-V_{TH19}-V_{DS17}-V_{GS15};  \quad (1)$$

where $V_{TH19}$ is the threshold voltage of the reset transistor, $V_{GS15}$ is the gate-to-source voltage of the source follower transistor 15, and $V_{DS17}$ is the drain-to-source voltage of the row select MOS switch transistor 17. The pixel output voltage as measured during the pixel reset function is therefore found to be a function of the MOS transistor threshold voltages of the pixel.

Beyond the undesirable effect of these threshold voltages on a single pixel's output, the threshold voltage of the reset transistor, $V_{TH19}$, can vary from one pixel to another across an imager array of pixels; and further, the drain-to-source voltage, $V_{DS17}$, of the switch transistor, being a function of that transistor's layout size and threshold voltage, as well as being a function of the column current source I, can vary across an imager array. In addition, the gate-to-source voltage, $V_{GS15}$, of the source follower transistor is a function of the layout size and the threshold voltage of that transistor, as well as being a function of the column current source I, and therefore can vary from pixel to pixel across an imager array.

In principle, these errors in the reset level output voltage of the pixel can be removed by double sampling of the pixel's output voltage. In an example double sampling technique, correlated double sampling (CDS) that can be employed in accordance with the present invention, the output of the pixel is first measured during the reset pulse, at time A, shown by the voltage timing diagram 2B of FIG. 2 as $V_O(A)$. This first output voltage measurement, i.e., the reset output voltage value, is stored in either an analog or a digital form, e.g., on a capacitor or in a memory cell.

Then the gate of the reset transistor 19 is brought down to 'low,' typically about the ground voltage level, in order to turn OFF the reset transistor, as indicated in the $V_{RESET}$ signal waveform of the voltage timing diagram 2A of FIG. 2. This in turn enables the voltage of the pixel sense node 14 to change in correspondence with illumination incident on the pixel.

The present invention also contemplates lowering of the reset transistor gate voltage following a prescribed waveform rather than a step function. The waveform can be, e.g., continuous or piecewise discrete, to produce a desired pixel transfer function, e.g., a nonlinear pixel output response to incident illumination.

More detail examples of such prescribed waveforms are described in co-pending U.S. patent application Ser. No. 10/037,885, filed Jan. 4, 2002, and entitled "Adaptive Sensitivity Control, On A Pixel-By-Pixel Basis, For A Digital Imager." The entire contents of U.S. patent application Ser. No. 10/037,885 are hereby incorporated by reference.

Whether the gate voltage of the reset transistor is lowered abruptly, e.g., as a step function, or following a selected waveform, the reset transistor introduces a feedthrough voltage, $V_{FT}$, that reduces the voltage at the pixel sense node 14 when the reset transistor is turned OFF, as indicated in the pixel output voltage waveform of the voltage timing diagram 2B of FIG. 2. This feedthrough voltage is due to the gate-to-source overlap capacitance as well as the channel charge of the reset transistor, and is also due to any stray capacitance between the reset signal line and the charge sensing node line.

After the voltage of the gate of the reset transistor is lowered from the 'high' level, the voltage on the sense node 14 decreases in response to the incidence of illumination on the pixel photodiode. The period during which this response is enabled is the integration period or time. The integration time is a function of both the frame rate selected for the imager and the length of the reset period, i.e., the duration of the presence of reset 'high' level pulses. The reset period may be defined by a single reset 'high' level pulse, or two or more reset 'high' level pulses generated in sequence to define a reset period within a frame period. The going 'low' of the last reset pulse in the reset period defines the end of the rest period.

Thus, the integration period of a frame period is equal to the period of time between the final reset pulse and the beginning of the next frame period. In other words, when the frame rate of an imager is fixed, the integration time can be adjusted by adjusting the duration of the reset period.

To complete the double sampling technique, at the end of the integration period the output voltage of the pixel is again measured, at time B, as shown in the voltage timing diagram 2B of FIG. 2. Time B is defined as that point in time just at the end of the integration period, before the reset level applied to the reset transistor is set to a 'high;' the reset waveform is still at a 'low' level. By making the second output voltage measurement at this point in time, the second measurement includes the same error components introduced into the first measurement, and further includes the change in pixel voltage due to incident illumination during the integration period. The pixel output voltage at time B can therefore be given as:

$$V_O(B)=V_{DD}-V_{TH19}-V_{DS17}-V_{GS15}-V_{FT}-V_{light} \quad (2)$$

where $V_{FT}$ is the feedthrough voltage component introduced at the photodiode capacitance sense node 14 when the reset transistor 19 is turned OFF, and $V_{light}$ is the voltage component representing the pixel's response to the incident illumination, given as:

$$V_{light} = \frac{I_{light}T_1}{C_{pix}} \quad (3)$$

where $I_{light}$ is the photocurrent generated in response to the incident illumination, $T_1$ is the integration time, and $C_{pix}$ is the photodiode capacitance 13 as well as other associated parasitic capacitance, as-measured at the sense node 14.

To determine the component of the pixel's output voltage that is due to incident illumination, the pixel output measurement taken during the reset pulse, $V_O(A)$, is subtracted from the pixel output measurement taken at the end of the integration period, $V_O(B)$. This subtraction negates the threshold errors, resulting in an indication of pixel's light response, but also includes the feedthrough term as:

$$V_O=V_O(B)-V_O(A)=-V_{FT}-V_{light}, \quad (4)$$

From expression (4) it can be seen that the double-sampling technique does not automatically remove the feedthrough component from the pixel's measured output voltage.

It is here noted that in the double-sampling technique described above, it can be preferred to row select the measurement times such that the requirement for storage of a measurement is minimized. For example, referring to the voltage timing diagram 2B of FIG. 2, the reset period pixel output voltage can be measured at a time C, during the reset period of a next sequential frame following that of a given integration period, rather during the reset period preceding that's frame's integration time. In this technique, the pixel output measured at time B is subtracted from the pixel output measured at time C, rather than time A. This adjustment in measurement time is acceptable for applications where the incident illumination is not expected to substantially change from one frame to a next sequential frame. The use of a measurement taken at time C rather than time A eliminates the need to store the reset period pixel output value for the duration of an integration period, and thus can be preferred for imaging of slowly changing scene intensities.

Whichever measurement times are selected, the resulting indication pixel voltage includes the feedthrough term $V_{FT}$, as demonstrated in expression (4) above. This term is a fixed component that does not change with time, but that varies across the array from pixel to pixel. Thus, the feedthrough term $V_{FT}$ produces a fixed pattern noise across an imager array that is highly undesirable.

The present invention provides a range of techniques for enabling measurement of a pixel output voltage in a manner that corrects for the feedthrough term $V_{FT}$, to produce a measurement of the true pixel response to incident illumination. In a first such technique provided by the present invention, the feedthrough term $V_{FT}$ is removed from the measurement indication by the following method, referring again to the voltage timing diagrams 2A and 2B of FIG. 2. In this method, the reset waveform of the voltage timing diagram 2A of FIG. 2 is applied to the gate of the reset transistor 19 as in the techniques described above. The pixel output voltage is also measured at two different times, as in the techniques described above, but here, both measurements are made at times when the reset waveform is 'low,' i.e., both measurements are made at times when the reset transistor is turned OFF.

In one such scenario, the pixel output voltage is measured at a first time, B, and a second time, C'. Time B is at the end of an integration period, just prior to turning ON the reset transistor, and time C' is just at the start of the integration period of the next sequential frame, just after turning OFF the reset transistor. The pixel output voltages measured at these two points in time are then:

$$V_O(B)=V_{DD}-V_{TH19}-V_{DS17}-V_{GS15}-V_{FT}-V_{light} \quad (5)$$

$$V_O(C')=V_{DD}-V_{TH19}-V_{DS17}-V_{GS15}-V_{FT} \quad (6)$$

Because both of these measurements are taken at times when the reset transistor is turned OFF, both measurements include the feedthrough component, $V_{FT}$. As a result, when the two measurements are subtracted as:

$$V_O=V_O(B)-V_O(C')=-V_{light}, \quad (7)$$

the feedthrough voltage term is eliminated. Thus, as demonstrated by expression (7), this technique results in the removal of the feedthrough component from the output voltage, whereby a more true measurement of the pixel output can be obtained.

The present invention does not absolutely require the use of the example measurement times B and C' described above; rather, the present invention only requires the use of measurement times that both coincide with a condition in which the pixel's reset transistor is turned OFF and that span substantially an entire integration period. For example, referring to the voltage timing diagram 2B of FIG. 2, the measurements could be taken at a first time, C", just at the start of an integration period, after the reset transistor is turned OFF, and the time B employed above, just at the end of the integration period of the same frame, before the reset transistor is turned ON. These two measurement points, like points B and C' described above, eliminate the feedthrough component in a pixel output voltage determination.

For many applications, the alternative measurement time pair of B and C" can be less preferable than B and C' because the measurement value at C" must be stored for the duration of the integration time. Similarly, a drawback of the use of the time pair B and C' is that the duration of time between points B and C' is a function of the duration of the reset pulse between the points, and a measurement taken at point B must be stored until a measurement at point C' is obtained. The reset pulse duration between points B and C' can be adjusted based on the operational control of the imager. For example, when a short integration time is desired, the reset pulse can be lengthened. This lengthening of the reset pulse results in an increased duration of time between measurement points B and C', requiring the holding the value of the measurement taken at time B for a longer period of time.

Figure 3A:
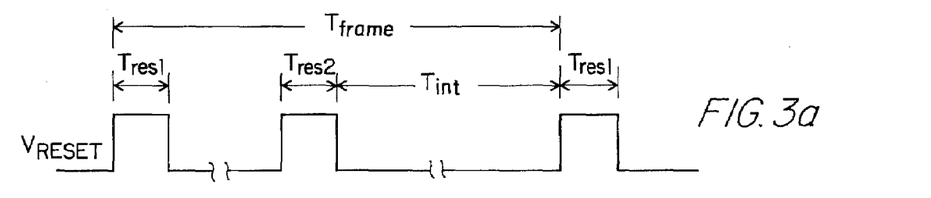
FIG. 3 is another set of timing diagrams showing exemplary voltage waveforms of a voltage reset for a pixel and a voltage output of the pixel according to the concepts of the present invention.
Figure 3B:
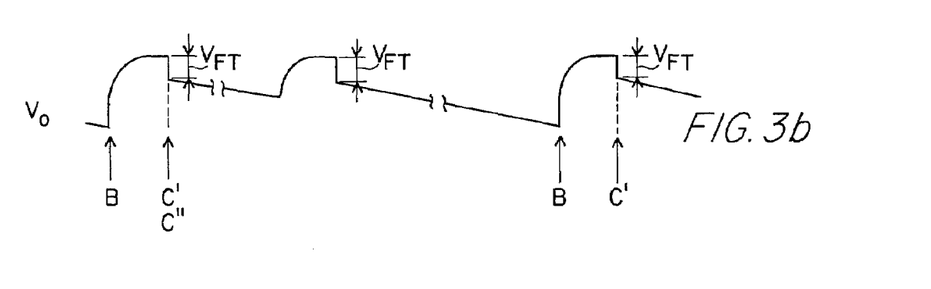

The present invention provides a pixel output measurement method that minimizes this storage requirement for the duration of the reset pulse. Referring to the voltage timing diagrams 3A and 3B of FIG. 3, in this second technique; a first reset pulse is imposed, indicated as $T_{res1}$ in the voltage timing diagram 3A of FIG. 3, during which the reset transistor is turned ON. The two pixel output voltage measurements are again taken at times B and C', i.e., just before and just after the reset pulse between two frames, as in the method just described. Both measurements taken at time B and C' include the feedthrough voltage component, $V_{FT}$, because both of the measurements are taken when the reset transistor is turned OFF, thereby canceling the feedthrough component from the pixel voltage determination in the manner described above. The duration of the first reset pulse, $T_{res1}$, is made short to minimize the time required to store the pixel output voltage measurement taken at time B.

A second reset pulse, $T_{res2}$, is provided to reset the pixel at a time after the first reset, effectively shortening the integration period. This second reset pulse can be made as long as necessary to produce a desired integration period, and/or can be positioned in time during the frame period to produce a desired integration period. Here the "integration period" of the frame is effectively controlled to be the duration of time between the last reset pulse of the frame and the first reset pulse of a next sequential frame. With this technique, the pixel voltage measurement storage requirements are minimized while at the same time enabling control over the integration period of a frame. When a maximized integration time is desired, the second reset pulse is merged with the first reset, reverting to the reset waveform of the voltage timing diagram 2A of FIG. 2.

This use of multiple reset pulses is found to introduce to the output voltage measurement a second feedthrough component that is smaller than the reset feedthrough component but that is nevertheless finite. This second feedthrough component is produced when the row select transistor 17 of the pixel is turned ON and OFF to enable an output voltage measurement of the pixel; this feedthrough component thus can be thought of as a row select feedthrough. When the row select transistor 17 is turned ON, the current source 25 is directed to the source follower transistor 15. This increases the gate-to-source voltage of the source follower. As a consequence, the source voltage of the source follower transistor 15 drops. This drop couples to the sense node through the gate-to-source capacitance of the source follower transistor 15.

Figure 4A:
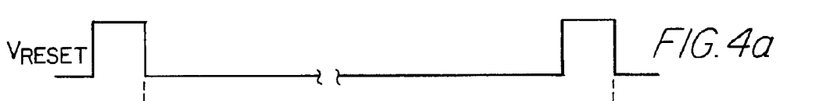
FIG. 4 is a set of timing diagrams showing exemplary voltage waveforms of a voltage reset for a pixel, a row select voltage for a pixel, and a voltage output of the pixel according to the concepts of the present invention.
Figures 4B, 4C:
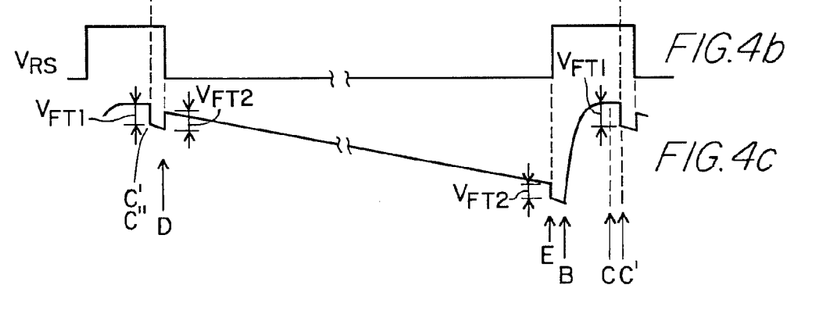
Figure 5A:
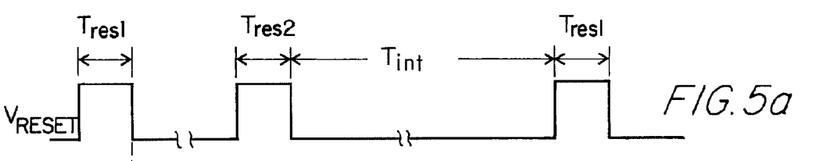
FIG. 5 is another set of timing diagrams showing exemplary voltage waveforms of a voltage reset for a pixel, a row select voltage for a pixel, and a voltage output of the pixel according to the concepts of the present invention.
Figures 5B, 5C:
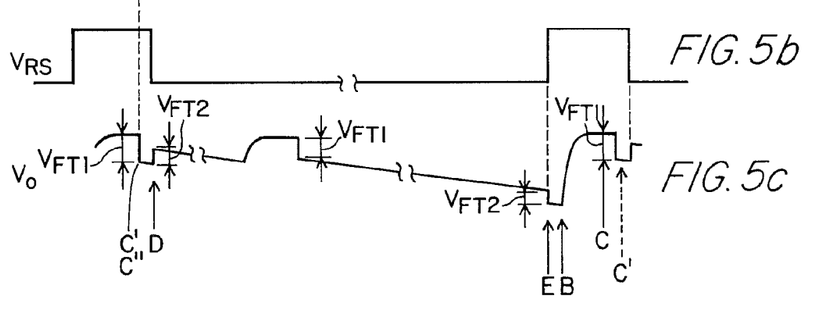

The effect of the row select feedthrough voltage component on the sense node voltage is shown in more detail in FIGS. 4 and 5. In FIGS. 4 and 5, the reset feedthrough component described previously is indicated as $V_{FT\ 1}$ and the row select feedthrough component just introduced is indicated as $V_{FT\ 2}$. The row select waveform, $V_{RS}$, is also indicated, for clarity. The row select transistor 17 must be turned ON to make a pixel output voltage measurement, and thus the row select waveform provides 'high' and 'low' states that correspond to selected times for making the measurements.

FIG. 4 illustrates the effect of the row select feedthrough component on the various methods described above. Consider first the method in which the pixel output voltage measurements are taken at times that do not enable cancellation of the reset feedthrough component. In this case, the two pixel output voltage measurements are taken at times B and C, as in the method described with regard to FIG. 2. Here, the row select transistor 17 is turned ON at both measurement time points. Although the row select feedthrough effect causes the sense node voltage to rise at time D by an amount, $V_{FT\ 2}$, when the row select is turned OFF, the sense node voltage drops precisely by the same amount when the row select is turned ON at time E in order to make the measurements at times B and C. Thus, the reset feedthrough component is not canceled out, but the row select feedthrough component is canceled out when the difference between the two measurements are taken.

Similarly, as illustrated in FIG. 4, for the method provided by the present invention in which the pixel output voltage measurements are made at times C' or C", when the reset transistor is OFF and the row select transistor is ON, the sense node voltage rises by a certain amount due to the row select transistor turning OFF. Moreover, as illustrated in FIG. 4, for the method provided by the present invention in which the pixel output voltage measurement is made at time B when the row select transistor is ON and before the reset transistor is turned ON, the sense node voltage falls by the same amount it rose at times C' or C", due to the row select transistor turning ON, thus the reset feedthrough component and the row select feedthrough component are both canceled out.

For scenarios in which a second reset pulse is incorporated into a frame period to shorten the integration time without the addition of corresponding row select pulses, the automatic cancellation of the row select feedthrough component is found not to occur.

Referring to FIG. 5, the row select transistor is turned ON before, or just at the start, and turned OFF after, or just at the end, of the first reset pulse, $T_{res1}$, to enable the output voltage measurements at any of times B, C, C', or C". However, it is the pairing of the reset transistor turning OFF at the end of one reset pulse and then ON at the start of the next reset pulse and the enabling of the output voltage measurements being taken at any of times B, C', or C" that automatically cancels out the reset feedthrough component in the output voltage measurements of the pixel.

But at the time of the second reset pulse, $T_{res2}$, if the row select transistor is not turned ON or OFF; no output measurements are to be made here, and the pixel is simply reset to shorten the integration time. Thus, for scenarios in which an additional reset pulse is included to shorten the integration time, there is no feedthrough voltage rise of an amount, $V_{FT\,2}$, at the end of the second reset pulse to compensate for the voltage drop of $V_{FT\,2}$ that occurs at time E of FIG. 5, the beginning of the reset pulse at the end of the frame period.

The present invention provides a technique for overcoming this introduction of a row select feedthrough component in the pixel output voltage measurement. In the technique, referring to the various voltage timing diagrams 6A–6C of FIG. 6, the row select feedthrough voltage, $V_{FT\,2}$, is cancelled by turning ON the row select transistor before or just at the start of the second reset pulse, and by turning OFF the row select transistor after or just at the end of the second reset pulse, as shown in the various voltage timing diagrams 6A and 6B of FIG. 6. In other words, the row select transistor is turned ON and OFF with each reset pulse, whether or not it is desired to make a pixel output measurement at the time of a given reset pulse. Alternatively, the row select transistor can be turned ON and OFF at the first and last reset pulse of the reset pulse, whether or not it is desired to make a pixel output measurement at the time of a given reset pulse.

Figure 6A:
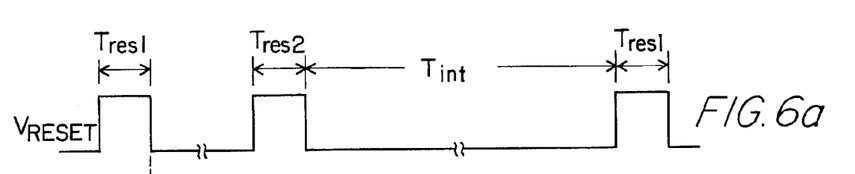
FIG. 6 is a third set of timing diagrams showing exemplary voltage waveforms of a voltage reset for a pixel, a row select voltage for a pixel, and a voltage output of the pixel according to the concepts of the present invention.
Figure 6B:
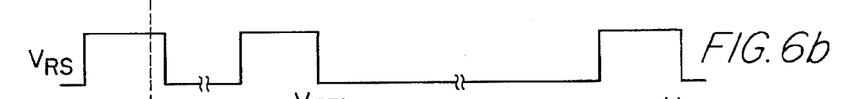
Figure 6C:
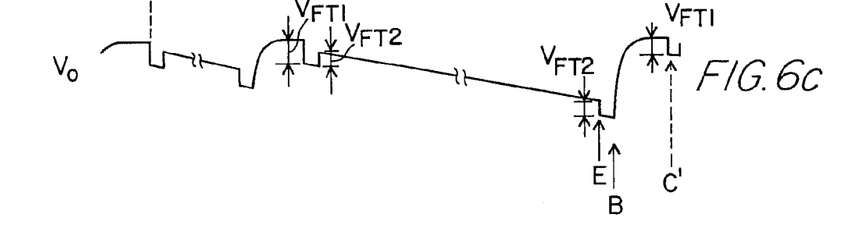

With operation illustrated in FIG. 6, at the end of the second reset pulse, when the row select transistor is turned OFF, it introduces the same voltage rise, $V_{FT\,2}$, as had been introduced when the row select transistor was turned OFF after the first reset pulse. This second $V_{FT\,2}$ rise cancels the $V_{FT\,2}$ drop produced subsequently at time E, when the row select transistor is again turned ON.

The present invention contemplates a variety of implementations of this compensation technique. Referring to the various voltage timing diagrams 7A–7C of FIG. 7, the compensation technique can be implemented in any manner that results in turning ON and OFF the row select transistor a number times that enables pairing of row select feedthrough components such that the components are negated in the subtraction of one pixel output measurement from another.

Figure 7A:
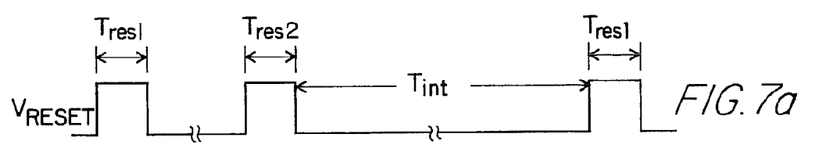
FIG. 7 is a fourth set of timing diagrams showing exemplary voltage waveforms of a voltage reset for a pixel, a row select voltage for a pixel, and a voltage output of the pixel according to the concepts of the present invention.
Figure 7B:
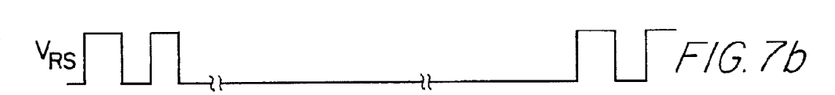
Figure 7C:
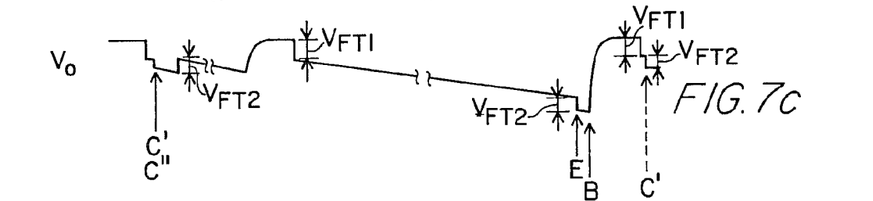

For example, the row select transistor can be turned OFF, i.e., $V_{RS}$ dropped to 'low,' before the first reset pulse ends. Then just at the end of the first reset pulse, the row select transistor can be turned ON, i.e., $V_{RS}$ brought to 'high' again, to enable the second output voltage measurement to be taken at time C' or C". Turning ON the row select transistor before the measurement causes the measured output pixel value to be lower by an amount $V_{FT\,2}$, corresponding to the $V_{FT\,2}$ drop in the pixel output voltage measurement taken at the end of the integration period, at time B, whereby there is no reset feedthrough component or row select feedthrough component in the difference in measurements taken at times B and C' or C".

The present invention further contemplates implementation of the feedthrough compensation methods described above in applications in which both "hard" and "soft" resets of a pixel are employed. The reset period here consists of a hard reset followed by a soft reset. The hard reset is carried out by setting the gate of the reset transistor at a voltage that is higher than the drain voltage of the reset transistor, which is typically at about $V_{DD}$; a gate voltage of at least about $V_{DD}+V_{TH19}$ is preferred. This results in the sense node of the pixel being "hard" reset to the drain voltage of the reset transistor, rather than the drain voltage minus the threshold voltage of the reset transistor. The soft reset corresponds to the reset transistor gate voltage of $V_{DD}$ as described above. This hard-soft reset scenario can be preferred for applications in which scene illumination is changing rapidly and dramatically from frame to frame, and therefore can reduce the degree of the phenomena known as image smearing. All of the techniques of the present invention described above can be applied to such a hard-soft reset scenario for enabling the cancellation of feedthrough components from measurements of the pixel output voltage.

Furthermore, although the descriptions above used specific pixel circuit configuration, the concepts of the present invention are not limited to a particular pixel circuit configuration. Moreover, although the descriptions above refer to a digital imager, the concepts of the present invention are not limited to a digital imager but may also be utilized in connection with an analog imager. Also, although the descriptions above refer to a row select switch, the concepts of the present invention are not limited to a row select switch but may also be utilized in connection with a column select switch, a hybrid of row and column select switches, or any switch used to select a pixel from which the output value is being captured. Lastly, although the descriptions above refer to the pixel's output being a voltage value, the concepts of the present invention are not limited to a digital imager but may also be utilized in connection with a pixel's output being a current value.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A method for determining a pixel output value of an imager due to incident illumination upon a pixel of the imager after a reset period, the imager having a pixel and a reset switch associated with the pixel, the method comprising:
   capturing a first pixel output value when the reset switch is OFF;
   capturing a second pixel output value when the reset switch is OFF, wherein the second pixel output value is captured near an end of a first integration period and the first pixel output value is captured near a beginning of a second integration period immediately subsequent to the first integration period; and
   determining the pixel output value based on a difference between the first and second pixel output values.

2. The method as claimed in claim 1, wherein a single reset value pulse defines the reset period, an initiation of the reset pulse defines an end of the first integration period, and a termination of the reset pulse defines a beginning of the second integration period.

3. The method as claimed in claim 1, wherein a plurality of reset value pulses defines the reset period, an initiation of a first reset pulse of the reset period defines an end of the first integration period, and a termination of a last reset pulse of the reset period defines a beginning of the second integration period.

4. The method as claimed in claim 1, the imager having a select switch associated with the pixel, the method further comprising:
   capturing the second pixel output value when the select switch is ON at an end of the first integration period; and
   capturing the first pixel output value when the select switch is ON at the beginning of the second integration period.

5. The method as claimed in claim 4, further comprising capturing the first pixel output value during a reset period.

6. The method as claimed in claim 4, wherein the select switch is a row select switch.

7. The method as claimed in claim 4, wherein the select switch is a column select switch.

8. The method as claimed in claim 4, further comprising canceling select switch feedthrough associated with the imager.

9. The method of claim 8, wherein canceling select switch feedthrough comprises:
   turning the select switch ON during a reset period;
   turning the reset switch ON after turning the select switch ON;
   turning the select switch OFF after turning the reset switch ON; and
   turning the reset switch OFF after turning the select switch OFF.

10. A method for determining a pixel output value of an imager due to incident illumination upon a pixel of the imager after a reset period, the imager having a pixel and a reset switch associated with the pixel, wherein a plurality of reset value pulses defines the reset period, the method comprising:
    capturing a first pixel output value when the reset switch is OFF during the reset period;
    capturing a second pixel output value when the reset switch is OFF near an end of a first integration period, wherein an initiation of a first reset pulse of the reset period defines an end of the first integration period, and a termination of a last reset pulse of the reset period defines a beginning of a second integration period; and
    determining the pixel output value based on a difference between the first and second pixel output values.

11. The method as claimed in claim 10, further comprising capturing the first pixel output value during the reset period corresponding to the first integration period.

12. The method as claimed in claim 10, further comprising capturing the first pixel output value during the reset period corresponding to a second integration period immediately subsequent to the first integration period.

13. The method as claimed in claim 10 the imager having a select switch associated with the pixel, the method further comprising:
    capturing the second pixel output value when the select switch is ON; and
    capturing the first pixel output value when the select switch is ON.

14. The method as claimed in claim 13, further comprising capturing the first pixel output value during the reset period corresponding to the first integration period.

15. The method as claimed in claim 13, further comprising capturing the first pixel output value during the reset period corresponding to a second integration period immediately subsequent to the first integration period.

16. The method as claimed in claim 13, wherein the select switch is a row select switch.

17. The method as claimed in claim 13, wherein the select switch is a column select switch.

18. The method as claimed in claim 13, further comprising:
    turning the select switch ON during the reset period;
    turning the reset switch ON after turning the select switch ON;
    turning the select switch OFF after turning the reset switch ON;
    turning the reset switch OFF after turning the select switch OFF;
    turning the select switch ON after turning the reset switch OFF;
    capturing the first pixel output value after turning the select switch ON;
    turning the select switch OFF after capturing the first pixel output value;
    turning the select switch ON near an end of the first integration period; and
    capturing the second pixel output value after turning the select switch ON.

19. The method as claimed in claim 13, further comprising:
    turning the select switch ON near a beginning of the first integration period;
    turning the reset switch ON after turning the select switch ON;
    turning the select switch OFF after turning the reset switch ON;
    turning the reset switch OFF after turning the select switch OFF;
    turning the select switch ON after turning the reset switch OFF;
    capturing the first pixel output value after turning the select switch ON;
    turning the select switch OFF after capturing the first pixel output value;
    turning the select switch ON near an end of the first integration period; and
    capturing the second pixel output value after turning the select switch ON.

20. The method as claimed in claim 13, further comprising:
    turning the select switch ON near an end of the first integration period;
    capturing the first pixel output value after turning the select switch ON;
    turning the reset switch ON after capturing the first pixel output value;
    turning the select switch OFF after turning the reset switch ON;
    turning the reset switch OFF after turning the select switch OFF;
    turning the select switch ON after turning the reset switch OFF; and
    capturing the second pixel output value after turning the select switch ON.

21. The method of claim 20, wherein turning the reset switch OFF further comprises turning the reset switch OFF during a reset period corresponding to a second integration period immediately following the first integration period.

22. The method as claimed in claim 13, further comprising canceling select switch feedthrough associated with the imager.

23. The method of claim 13, wherein canceling select switch feedthrough comprises:
    turning the select switch ON during the reset period;
    turning the reset switch ON after turning the select switch ON;
    turning the select switch OFF after turning the reset switch ON; and
    turning the reset switch OFF after turning the select switch OFF.

* * * * *